US006282769B1

United States Patent
Longo et al.

(10) Patent No.: US 6,282,769 B1
(45) Date of Patent: Sep. 4, 2001

(54) MOTOR VEHICLE END MODULE ASSEMBLY

(75) Inventors: Thomas W. Longo, Sterling Heights; Robert F. Yustick, West Bloomfield, both of MI (US)

(73) Assignees: Cosma International Inc.; Decoma International Inc., both of Concord (CA)

( * ) Notice: Subject to any disclaimer, the term of this patent is extended or adjusted under 35 U.S.C. 154(b) by 0 days.

(21) Appl. No.: 09/352,133

(22) Filed: Jul. 13, 1999

Related U.S. Application Data (60) Provisional application No. 60/092,955, filed on Jul. 15, 1998.

(51) Int. Cl.[7] .................................................. B23P 17/00
(52) U.S. Cl. ................................ 29/417; 29/412; 29/428; 29/445; 29/469; 72/254
(58) Field of Search .......................... 29/412, 417, 428, 29/445, 469; 72/254

(56) References Cited

U.S. PATENT DOCUMENTS

| | | |
|---|---|---|
| 1,874,400 | 8/1932 | White . |
| 2,715,448 | 8/1955 | Zeeb . |
| 3,267,711 * | 8/1966 | Anderson ............................. 72/19.4 |
| 3,764,034 * | 10/1973 | Klugman ............................. 220/4.24 |
| 3,848,886 | 11/1974 | Feustel et al. . |
| 4,141,426 | 2/1979 | Hamada et al. . |
| 4,509,781 | 4/1985 | Dick et al. . |
| 4,559,797 * | 12/1985 | Raymond ................................. 72/63 |
| 4,589,184 | 5/1986 | Asano et al. . |
| 4,973,102 | 11/1990 | Bien . |
| 5,122,934 | 6/1992 | Schmidt . |
| 5,123,695 | 6/1992 | Kanemitsu et al. . |
| 5,301,411 | 4/1994 | Fujiwara et al. . |
| 5,358,304 | 10/1994 | Kanemitsu et al. . |
| 5,927,129 * | 7/1999 | Thoms et al. ........................... 72/268 |
| 6,205,638 * | 3/2001 | Yustick .................................... 29/464 |

FOREIGN PATENT DOCUMENTS

| | | |
|---|---|---|
| 196 12 479 | 12/1997 | (DE) . |
| 0 437 780 A1 | 7/1991 | (EP) . |
| 0 519 776 | 12/1992 | (EP) . |
| 0 519 776 A1 | 12/1992 | (EP) . |
| 0 601 937 A1 | 6/1994 | (EP) . |
| 1 534 775 | 12/1978 | (GB) . |
| 0107238 * | 6/1983 | (JP) ........................................ 72/254 |
| 3-13282 | 2/1991 | (JP) . |

OTHER PUBLICATIONS

English Translation of European Application 601937.
English Translation of European Application 519776.

* cited by examiner

Primary Examiner—S. Thomas Hughes
Assistant Examiner—Essama Omgba
(74) Attorney, Agent, or Firm—Pillsbury Winthrop LLP (57) ABSTRACT

An end module assembly has an internal support structure. An exterior fascia is mounted to the internal support structure. The fascia is configured to be a portion of a vehicle body assembly when the end module assembly is installed on the vehicle. An external visible component is mounted to the support structure in a fixed relationship with respect to the fascia in proper alignment with respect to the fascia with a surface thereof facing exteriorly of the fascia. A bumper beam and bumper beam mounting structure connects the bumper beam to the internal support structure. A mounting structure is connected to the support structure for attaching the support structure to mounting points on the partially completed motor vehicle. The mounting structure permits selective repositioning of the end module assembly in a longitudinal, vertical and horizontal direction relative to the partially completed motor vehicle whereby the fascia is alienable with respect to the remaining portions of the vehicle body assembly prior to secure engagement of the end module to the partially completed motor vehicle.

6 Claims, 6 Drawing Sheets

MOTOR VEHICLE END MODULE ASSEMBLY

The present application claims priority to U.S. Provisional Application of Longo et. al., Ser. No. 60/092,955, filed Jul. 15, 1998, the entirety of which is hereby incorporated into the present application by reference.

FIELD OF THE INVENTION

The present invention relates to front or rear end module assemblies that are to be installed onto a partially completed motor vehicle.

BACKGROUND OF THE INVENTION

PCT Application WO 99/21748 discloses an end module assembly for installation on the front or rear end of a partially completed motor vehicle and a method for making the same. While WO 99/21748 broadly discloses the end module assembly concept and methods for constructing end module assemblies with properly aligned exterior components, further efforts and developments have revealed certain improvements to enhance the end module assembly's functional performance and the aesthetic appearance of the resulting vehicle.

The end module assembly (front or rear) is intended to be assembled separately from the remainder of the vehicle and then subsequently shipped to the OEM (original equipment manufacturer) for installation on a partially completed motor vehicle. As a result, this introduces the potential for errors either in the vehicle frame assembly or in the end module assembly that can lead to the end module assembly and its exterior fascia being misaligned with respect to the remainder of the vehicle when installed. Misalignment between the module assembly's exterior fascia and the remainder of the body assembly is not acceptable because it detracts significantly from the vehicle's overall aesthetic appearance and requires correction before the vehicle can leave the assembly site.

In both the arrangement disclosed in WO 99/21748 and in conventional vehicle constructions, the bumper beam is fastened to the frame assembly at the end of the vehicle. Normally, this connection is at the ends of the frame rails. This is done so that collision forces received by the bumper beam will be transmitted to the frame assembly, which is more robust and better suited for absorbing collision forces than the body assembly. When dealing with vehicles in which relative movement is permitted between the frame and body assemblies, ample space must be provided to ensure that the bumper beam does not contact the vehicle body assembly, especially the fascia panels, during such relative movement. This is to prevent the bumper beam from damaging body assembly components as the vehicle is being driven over rough terrain. In pick-up trucks and sport utility vehicles, this space for accommodating the bumper beam's movement manifests itself as a visible gap between the exterior bumper cover and the fascia at the front end of the vehicle.

For end module assemblies that mount on vehicles in which relative movement is permitted between the vehicle frame assembly and the vehicle body assembly, WO 99/21748 discloses the end module assembly as mounting on round rubber blocks for movement along with the body assembly relative to the vehicle frame assembly. The bumper beam is carried loosely within the module assembly and then attached separately to the vehicle frame assembly. This requires separate brackets for loosely carrying the bumper beam and additional assembly steps to ensure that the bumper beam is securely fastened to the vehicle frame assembly.

In the end module assembly of WO 99/21748, the engine is assembled to the vehicle separately from the end module assembly and then the engine is connected to the various power-operated systems in the end module assembly and throughout the remainder of the vehicle. Making these connections requires a number of assembly steps and then testing is required to ensure that the systems in the vehicle are connected and functioning properly.

For vehicles of varying heights and/or widths, the exterior fascia and the internal support structure must be sized to fit properly on the vehicle. Specifically, the height and width of each internal support structure must be chosen for proper fit on the vehicle for which it was designed. One way to accomplish this would be to have separate tools that have been customized to form the components of each internal support structure to predetermined sizes so that the resulting support structures are properly sized for the vehicle on which they are to be installed. Using separate sets of tools for each type of end module assembly, however, is very costly and requires a great deal of factory space and the workers necessary to run each tool.

SUMMARY OF THE INVENTION

The disadvantages of the prior art may be overcome by providing an end module assembly having an internal support structure. An exterior fascia is mounted to the internal support structure. The fascia is configured to be a portion of a vehicle body assembly when the end module assembly is installed on the vehicle. An external visible component is mounted to the support structure in a fixed relationship with respect to the fascia in proper alignment with respect to the fascia with a surface thereof facing exteriorly of the fascia. A bumper beam and bumper beam mounting structure connects the bumper beam to the internal support structure. An adjustable mounting structure is connected to the support structure for attaching the support structure to mounting points on the partially completed motor vehicle. The adjustable mounting structure permits selective repositioning of the end module assembly in a longitudinal, vertical and horizontal direction relative to the partially completed motor vehicle whereby the fascia is alignable with respect to the remaining portions of the vehicle body assembly prior to final attachment of the end module to the partially completed motor vehicle.

According to another aspect of the invention, there is provided an end module assembly specially designed for installation on a partially completed motor vehicle that has a frame assembly and a body assembly between which a limited amount of relative movement is permitted during vehicle operation.

According to yet another aspect of the invention, there is provided an end module assembly comprising an exterior fascia, an external visible component, and an internal support structure. The external visible component is mounted to the support structure in a fixed relationship with respect to the fascia so that the external visible component is properly aligned with respect to the fascia with a surface thereof facing exteriorly of the fascia.

According to another aspect of the invention, there is provided a module assembly having an engine and a plurality of power-operated components that draw power from the engine during vehicle operation. The engine is mounted on an engine mounting structure and operatively connected in power supplying relation to the power-operated components so as to supply power to the power-operated components during vehicle operation. A mounting structure is connected to the internal support structure and the engine supporting structure and attaches to mounting points on the frame assembly of the partially completed motor vehicle so as to mount the end module assembly.

According to yet another aspect of the invention, there is provided a method for making a plurality of end module assemblies for installation on partially completed vehicles having varying heights and/or widths at their respective ends. A plurality of exterior fascias and a plurality of exterior visible components are provided. A plurality of internal support structures each having a height and width suitable to support the exterior visible components in proper alignment with respect to corresponding ones of the exterior fascias are formed. These internal support structures are formed by forming a size determining component for each of the plurality of internal support structures so as to provide the size determining components with varying lengths in a given direction. The length of each of the size determining components in the given direction determines the heights or widths of the internal support structures when the internal support structures are assembled. The size determining components are also shaped by feeding successive blanks of metal material into the same die assembly and then operating the die assembly to impart the same general shape to each size determining component irrespective of the length of the size determining components. The forming to length may take place before or after the shaping. Then, the size determining component of each internal support structure is assembled with the remaining components of each internal support structure so as to form the aforesaid plurality of internal support structures. The exterior fascias are then mounted in place with respect to corresponding ones of the internal support structures, and the exterior visible components are mounted to corresponding ones of the internal support structures in proper alignment with respect to the corresponding ones of the exterior fascias.

Other objects, features, and advantages of the present invention will become apparent from the following detailed description, the accompanying drawings, and the appended claims.

DETAILED DESCRIPTION OF THE PREFERRED EMBODIMENT OF THE INVENTION

FIGS. 1–4B show the structural sub-assembly of a front end module assembly with all the functional and decorative components (e.g. headlamps, radiator, exterior fascia etc.) removed. The sub-assembly shown is for a front end module assembly similar to the type disclosed in International Patent Application Ser. No. WO 99/21748, the entirety of which is incorporated into the present application by reference. The structural sub-assembly includes an internal support structure, generally indicated at 100, that provides the main structural support for mounting the components associated with the front end of the motor vehicle, such as the headlamps, radiator, etc. In particular, it is contemplated to mount the exterior fascia (not shown) and the exterior visible components to the internal support structure 100 with the exterior visible components properly aligned with respect to the fascia and supported by the support structure 100. This allows the end module assembly to be installed on a partially completed vehicle without the need for separately aligning and installing the exterior visible components. These exterior visible components include the grill, the headlamps, turn signals, and any other components that are visible from the vehicle exterior and need to be properly aligned with respect to the fascia for aesthetic purposes.

Figure 1:
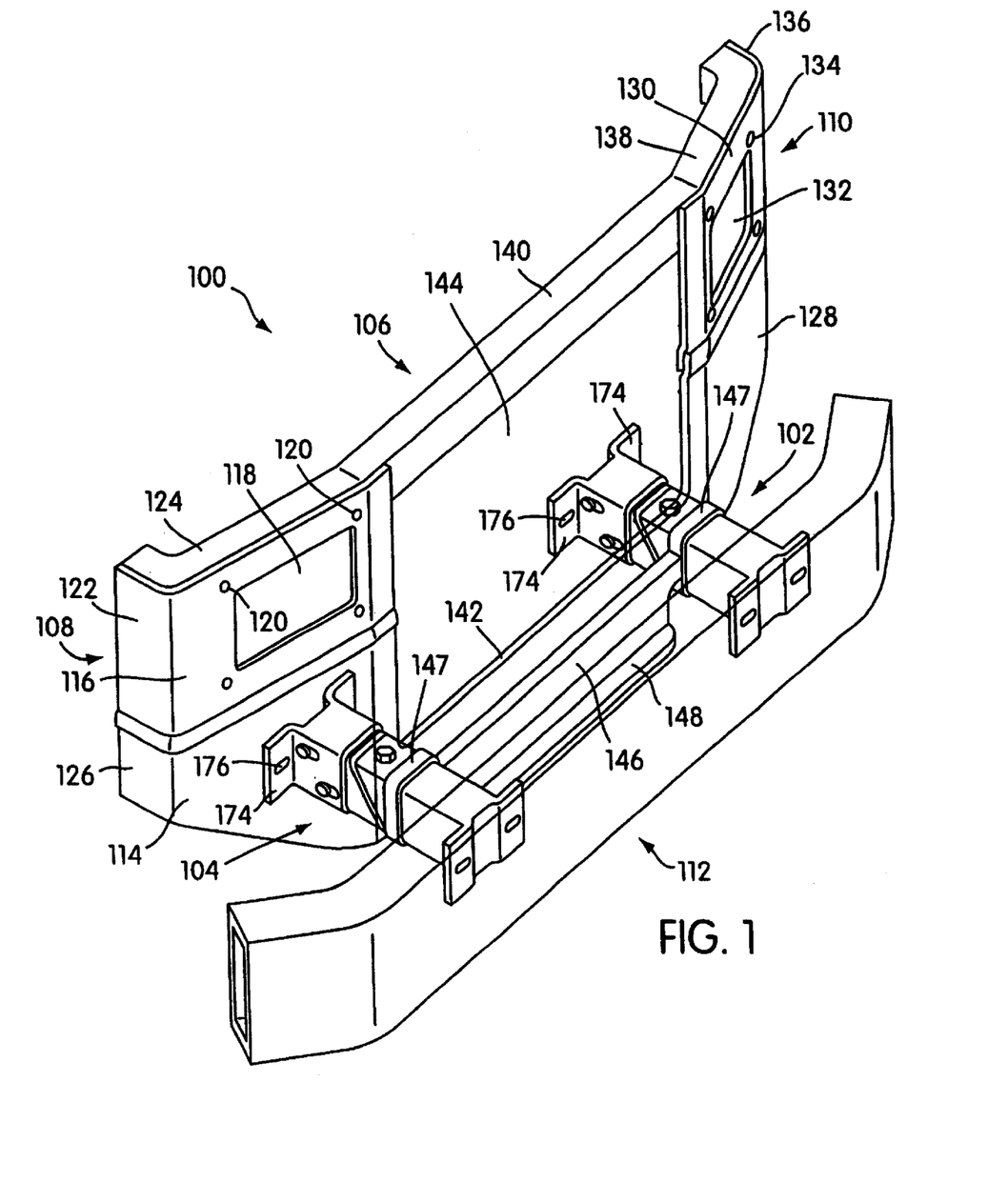
FIG. 1 is a perspective view of the structural sub-system of a front end module assembly constructed in accordance with the principles of the present invention.

The internal support structure 100 is mounted on a pair of rail assemblies, generally indicated at 102 and 104, that extend in the fore and aft direction of the vehicle when the front end module assembly is installed. The support structure 100 includes a centrally disposed radiator support structure 106 and a pair of outer support structures, generally indicated at 108 and 110, disposed on opposing lateral sides of the radiator support structure 106. A bumper beam, generally indicated at 112, is mounted forwardly of the radiator mounting structure 106.

The right outer support structure 108 includes a lower support member 114 and an upper support member 116. The upper support member 116 has a headlamp receiving opening 118 configured to receive a right headlamp (not shown) and a plurality of fastener-receiving openings 120 configured to receive fasteners for mounting the right headlamp. A wing section 122 of the upper support member 116 is bent so as to extend generally in the aft direction of the vehicle when the module assembly is mounted on the vehicle. A beam 124 extends across the rearward surface of the upper support member 116 and provides the member 116 with structural support. Beam 124 can be, but is not limited to, roll formed, stamped, or hydroformed metal. The beam 124 is fixed to the upper support member 116 by suitable means such as bolts and/or welding. The lower support member 114 is attached to the upper support member 116 by suitable means such as bolts or welding. Like the upper support member 116, the lower support member has a wing section 126 that is bent so as to extend generally in an aft direction of the motor vehicle when the structural sub-system 100 is installed.

The left outer support structure 110 includes a lower support member 128 and an upper support member 130.

Like upper support member 116, the upper support member 130 has a headlamp receiving opening 132 configured to receive the left headlamp (not shown) and a plurality of fastener-receiving openings 134 configured to receive fasteners for mounting the left headlamp. A wing section 136 of the upper support member 130 is bent so as to extend generally in the aft direction of the vehicle when the module assembly is mounted on the vehicle. A beam 138 similar to bent beam 124 extends across the rearward surface of the upper support member 130 so as to provide structural support. The beam 138 is fixed by suitable means such as bolts and/or welding.

The lower support member 128 is attached to the upper support member 130 by suitable means such as bolts or welding. Like the upper support member 130, the lower support member 128 has a wing section (not shown as a result of the perspective view) which is bent so as to extend generally in an aft direction of the motor vehicle when the structural sub-system is installed in the vehicle.

An upper cross-vehicle support structure 140 extends transversely between the upper support members 116, 130 of the outer support structures 108, 110. The upper cross-vehicle support 140, which can vary in length to suit various vehicle widths, is welded at each end to the bent beams 124, 138 to interconnect the upper support members 116,130 The upper cross-vehicle support structure 140 provides the radiator (not shown) of the vehicle with an upper mounting point within the internal support structure 100.

A lower cross-vehicle support member 142 extends transversely between the lower support members 114, 128 of the outer support structures 106, 108. The lower cross-vehicle support member 142 is fixed directly to the rail assemblies 102, 104 by welding or bolting and provides the radiator of the vehicle with a lower mounting point. Together, the upper and lower cross-vehicle support structures 140, 142 and the outer support structures 108, 110 provide a radiator-receiving opening 144. The upper and lower cross-sectional support members 140, 142 define the aforesaid centrally disposed radiator mounting structure 106. A radiator is to be mounted in the radiator-receiving opening 144 of the radiator mounting structure 106 during the assembling of the front end module assembly so that the radiator can be easily mounted on the vehicle along with the module assembly. The upper and lower cross-vehicle support structures 140, 142 support the radiator within the internal support structure 100.

Figure 2:
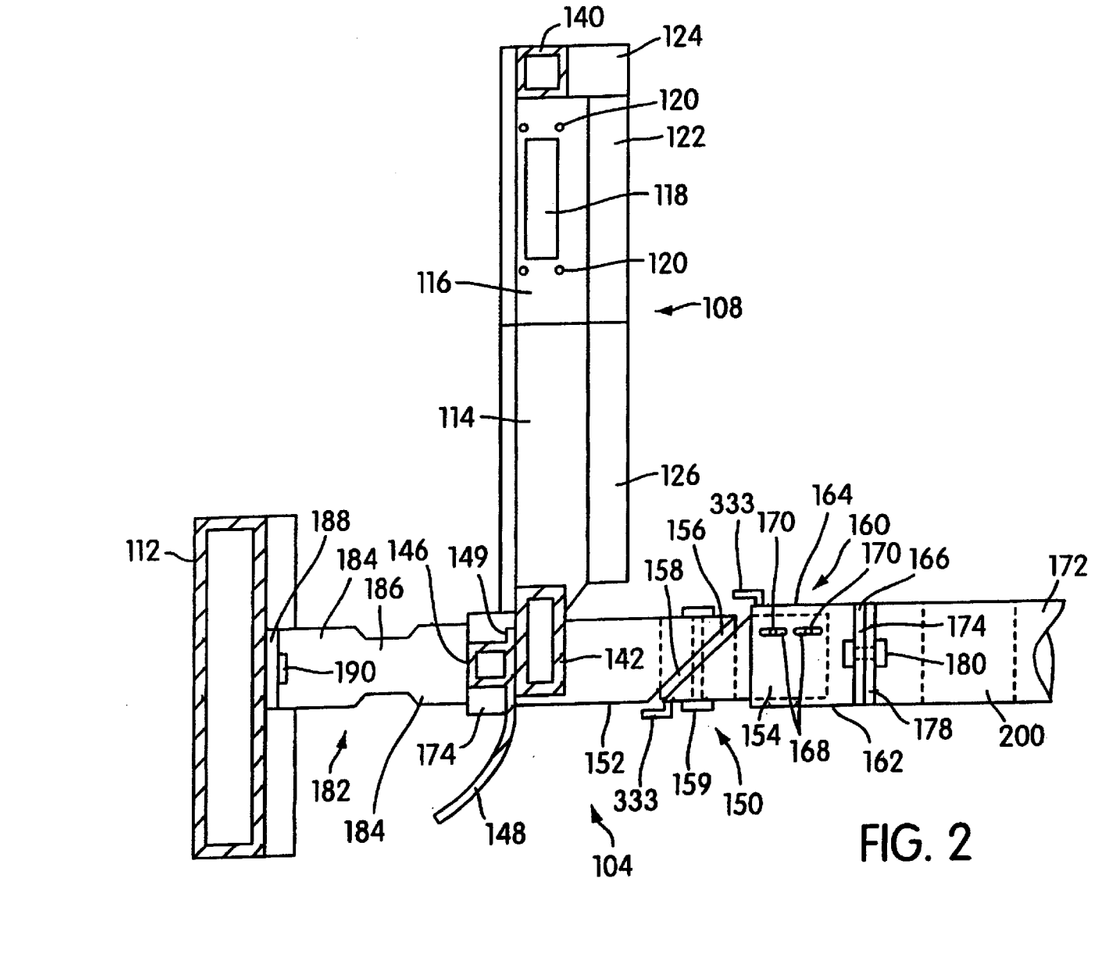
FIG. 2 is a cross-sectional view of the structural sub-system of a front end module assembly of FIG. 1.

An air dam structure 146 is mounted transversely between the rail assemblies 102, 104. A pair of mounting brackets 147 at opposing transverse ends of the air dam structure 146 are welded or bolted to the rail assemblies 102, 104. The air dam structure 146 can be integral with or attached to the lower cross-vehicle support structure 142 by means of welding upwardly extending weld flange 149 directly to the forwardly facing surface of the lower cross-vehicle support structure 142. An air directing portion or "scoop" 148 depends downwardly from the air dam structure 146. As can be appreciated from FIG. 2, the air directing portion 148 has an arcuate shape with its concave side facing towards the front end of the vehicle. The air directing portion 148 of the air dam structure 146 directs air upwardly into the radiator and/or engine compartment while the vehicle in which the front end module assembly is installed is being driven. As can be seen in FIG. 2, the air directing portion 148 is formed integrally with the air dam structure 146, although it could be attached as a separate component by welding or the like. The uppermost portion of the air directing portion 148 can be integral with or welded to the lower cross-vehicle support structure 142 to provide additional securement.

Mounting the lower cross-vehicle support structure 142 directly to the rail assemblies 102, 104 is desirable to prevent frame "rail spread" from occurring during collision conditions. The term "rail spread" is used to describe the outward bending of the rail assemblies 102, 104 away from one another that can occur during a front end collision and weaken the overall structural integrity of the vehicle frame assembly. Mounting the air dam structure 146 between the rail assemblies 102, 104 provides additional support against such rail spread.

The height of the module assembly 100 is dictated by the height of the vehicle into which it will be installed. Likewise, the width of the module assembly 100 is also dictated by the width of the vehicle into which it will be installed. However, motor vehicles come in a number of shapes and sizes and vary greatly in height and width. From an economic viewpoint, it is undesirable and inefficient to create separate toolings for every variation in height and width for the different front end module assemblies that one or more OEM's (original equipment manufacturers) may desire. Thus, a number of the structural support components for the front end module assembly may be constructed in a manner to utilize "common tooling."

The idea behind common tooling is to manufacture corresponding components in similar assemblies using the same tool. The size of each component is varied by either cutting the component down after forming the component in the tool or varying the amount of material supplied to the tool during forming. Applying this concept to the present invention, it is contemplated to manufacture the structural sub-assemblies for front end module assemblies of different sizes by varying the height, length and/or width of strategic components from common tools. In the preferred method of the invention, the tooling used to form the members discussed hereinbelow is a stamping die. However, other metal forming methods may be used.

Turning first to the height of the module assembly, the height of the module assembly is determined by the height of the generally vertically extending outer support structures 108, 110. In forming an internal support structure 100 of a given height, the upper support members 116, 130 and the beams 124, 138 are fixedly attached together by various means such as bolts or welding. The lower support members 114, 128 are then fixedly attached to the lower ends of the upper support members 116, 130. Any suitable method or structures may be used to join the support members together, such as adhesives, bolting or welding overlapping portions. In order to create an internal support structure 100 having a lower height, the lower support members 114, 128 can be created from the same tool as before and then portions can be cut off from the lower support members 114, 128 before attaching them to the upper support members 116, 130. The resultant module assembly will have a lower height determined by the size of the portions being cut off from the lower support members 114, 128 before assembling them together.

Likewise, the upper support members 116, 130 may be cut short instead of the lower support members to provide the internal support structure 100 with its desired overall height. Another alternative is to omit the use of separate upper and lower support members and simply form a single support member for each side of the support structure 100 and then cut the single support members to the appropriate height.

With respect to the width of the front end module assembly 100, the width can also be varied without using different toolings for corresponding components by modifying the length of the upper and lower cross-vehicle support structures 140, 142. In order to make the internal support structure 100 of the front end module assembly narrower, the cross-vehicle support members 140, 142 can be created from their respective tools and portions of the cross-vehicle support members 140, 142 can then be cut off before assembling the module assembly 100. By simply cutting off the portions of the cross-vehicle support structures 140, 142 for module assemblies of narrower width, there is no need to utilize different toolings in order to make cross-vehicle support structures 140, 142 of varying lengths.

Because the outer support structures and the upper and lower cross-vehicle support structures determine the height and width, respectively, of the internal support structure, they may be broadly referred to as being size determining components because they are determinative of the resulting size of the resultant internal support structure.

Severing or cutting off portions of the support structures mentioned above is not the only way to utilize the same toolings when assembling front end module assemblies of varying sizes. It is contemplated to "short blank" materials when utilizing a metal forming process or to use flying cut-off roll formed parts. When short blanking, only the amount of material needed to form the desired structure is disposed in a stamping die before being stamped. The resultant structure will then be formed with the desired dimensions without the need for cutting it down. By way of example, if the normal length of the upper and lower cross-vehicle support structures 140, 142 were three feet and one desired to shorten the width of the module assembly by one foot, then one could simply place two feet of material into the usual three foot die blank and perform the usual metal forming process (usually stamping) to form one of the cross-vehicle support structures 140, 142. The same steps would be taken to form the other of the cross-vehicle support structures 140, 142.

After assembling the internal support structure, it can then be matched up with its corresponding exterior fascia of suitable height and width for the vehicle onto which the end module assembly will be installed. Because the exterior visible components are being mounted to the internal support structure, the internal support structure positions the exterior visible components relative to the exterior fascia. It is important to ensure that the fascia and the internal support structure are properly matched up so that the exterior visible components are properly aligned with respect to the fascia and so that both the fascia and the internal support structure have a heights and width suitable for installation on its intended vehicle.

The bumper beam 112 is mounted to the end module assembly in an operative position so that there is no need to assemble the bumper beam 112 to the frame assembly of the vehicle separately from the module assembly. Such an arrangement is achieved by using a dynamic force isolator assembly, generally indicated at 150, in order to isolate relative movement between the vehicle frame assembly and the components of the front end module assembly located forwardly of the isolator assembly 150 and associated with the vehicle body assembly.

Conventionally, most motor vehicles use some type of isolator between the frame assembly and the body assembly in order to allow relative movement therebetween. Usually, the isolator is a rubber block that is mounted on the vehicle frame and the body system is mounted on top of the isolator. The nature of the conventional isolator allows the frame to move relative to the body system in the vertical direction in the event of an upwardly directed force, such as driving over a pothole. Typically, the bumper beam is mounted to the vehicle frame assembly and a vertical gap must be provided between the bumper beam and the vehicle body assembly in order to accommodate the relative movement permitted by the isolator and prevent interference damage to the body assembly from the bumper beam 112.

The dynamic isolator assembly 150 of the present invention, however, obviates the need for assembling the bumper beam structure 112 separately or providing a gap between the body system and the bumper beam structure 112. Instead of mounting the internal support structure 100 of a front end module assembly on top of an isolator, a dynamic isolator assembly 150 is built into the rail assembly 102, 104. As can be seen best in FIG. 2, the rail assembly 104 (rail assembly 102 will have corresponding structures) comprises a forward rail portion 152, which can be integral to end portion 184, and a rearward rail portion 154. The ends of the forward and rearward rail portions 152 and 154 can be cut diagonally as shown in FIG. 2. However, it is to be understood that the principles of the present invention are not limited to the diagonally cut configuration shown. A force isolator 156 in the form of a rubber or rubber-like mass is disposed partially within the hollow interior of the forward rail portion 152 and partially within the interior of the rearward rail portion 154. The isolator 156 is arranged within the hollow interiors of each rail portion 152, 154 so that the cut ends of the rail portions 152, 154 extend generally parallel to one another with a gap 158 extending therebetween. A vertically extending bolt 159 fastens the isolator 156 and the forward and rearward rail portions 152, 154 together.

The isolator 156 and the gap 158 between the rail portions 152, 154 allow for relative movement between the rail portions 152, 154. The rear rail portion 154 may be broadly considered part of a module mounting structure because it functions to connect the module assembly to the vehicle frame. The forward rail portion 152 may be broadly considered part of a bumper beam mounting structure because it functions to carry the bumper beam on the end module assembly.

Because the rear rail portion 154 is attached to the vehicle frame assembly, relative movement between the rail portions 152, 154 provides relative movement between vehicle frame assembly and the structures of the front end module assembly located forwardly of the gap 158, including the bumper beam 112, the internal support structure 100, and the various components attached to the internal support structure 100 (e.g. the fascia, the radiator, the headlamps, the grill, etc.). The width of the gap 158 determines the allowable amount of relative movement permitted. In the event of a collision, the collision forces will be transmitted from the bumper beam 112 to the rails 172 of the vehicle frame assembly through rail portions 152, 154 by utilizing limiting member 333 to force aligned axial loading. Specifically, the limiting member 333 serves to prevent the rail portions 152, 154 from moving vertically out of alignment with one another as a result of the rail portions 152, 154 sliding along the diagonally cut ends when abutted. This forces an abutted relationship during collision and ensures that the collision forces are transmitted to the frame rails 172.

The force isolator aspect of this application may also be practiced in conventional framed vehicles that are not assembled by using an end module assembly. Accordingly, the bumper beam and the force isolator may be broadly considered to be part of a bumper beam system irrespective of whether the car is formed with modular ends or in a more conventional fashion.

The internal support structure 100 of the present invention is mounted onto the vehicle frame assembly at the lower portion thereof using a pair of adjustable mounting structures, generally indicated at 160. Each adjustable mounting structure 160 comprises a mounting bracket 162 having a forwardly extending sleeve portion 164 integrally formed with a mounting portion 166. The rearward rail portion 154 of the rail structure 104 is slidably received within the hollow interior of the sleeve portion 164 of the mounting bracket 162. The sleeve portion 164 has a pair of slots 168 formed through each side wall thereof and extending in the longitudinal direction of the vehicle. A pair of bolts 170 are inserted into these slots and tightly engage the side walls of the rearward rail portion 154 to fasten adjustable mounting structure 160 to the front end module assembly. The arrangement of the bolt 170 and slot 168 allows the position of the rearward rail portion 154 to be adjusted within the sleeve portion 164 of the mounting bracket 162.

The mounting portion 166 of each mounting bracket 162 mounts to one of the rails 172 of the vehicle frame assembly. The mounting portion 166 has a pair of outwardly extending flanges 174 which extend generally perpendicularly to the side walls of the sleeve portion 164. Bolt-receiving holes 176 are formed through each of the outwardly extending flanges 174. Likewise, a pair of outwardly extending flanges 178 are provided on each frame assembly rail 172. The flanges 178 on the frame rails 172 also have bolt-receiving openings (not shown) formed therethrough. When mounting the structural sub-system to the vehicle, bolts 180 are inserted through the bolt-receiving openings 176 of the outwardly extending flanges 174 and the bolt-receiving openings of the outwardly extending flanges 178 and then fixed therein so as to fixedly secure the rail assemblies 102, 104 of the module assembly to the vehicle frame assembly.

One problem that can arise with such a mounting is that the rails of the vehicle frame assembly can be misaligned or incorrectly manufactured and thereby cause the front end module assembly to be mounted in a misaligned manner. For example, if the rails 172 of the vehicle frame assembly extend forwardly beyond their specified positions, then the front end module assembly will tilt upwardly relative to the remainder of the vehicle when installed. Likewise, if the rails 172 are shorter than desired and do not extend forwardly to their specified positions, then the module assembly will be tilted downwardly relative to the remainder of the vehicle. In order to compensate for such misalignments, the adjustable mounting structure 160 of the present invention allows for adjustments to be made when mounting the front end module assembly to the vehicle in order to ensure proper positioning. Such adjustment is accomplished by adjusting the position of the adjustment bolts 170 within the adjustment slots 168.

The adjustability provided by these slots 168 compensates for the frame rails 172 being extended too far forward or not being extended far enough forward by loosening the adjustment bolt 170 and sliding the rear rail portion 154 within the sleeve portion 162 until the correct positioning of the end module assembly is achieved. The adjustment bolt 170 can then be re-tightened within the slot 168 in order to fix the position of the end module assembly in place. Basically, the adjustable mounting structures 160 allows the effective length of the rail assemblies 102, 104 to be adjusted in order to accommodate variations in the length of the frame rails 172.

Additionally, the bolt-receiving openings 176 on the outwardly extending flanges 174 of the mounting bracket 162 are oversized relative to the size of the bolt 180 inserted therein. The oversized configuration of the bolt-receiving openings 176 allows the position of the front end module assembly to be adjusted both vertically and horizontally relative to the remainder of the vehicle. Thus, if one or both of the rails 172 of the vehicle frame assembly are too high or misaligned to the right or left, the oversized configuration 168 of the bolt-receiving openings 176 allows loosening and subsequent movement of the bolts 180 within the openings 176 so that the position of the mounting brackets 162 can be adjusted relative to the frame rails 172 in order to compensate for such errors in the vehicle frame assembly. Thus, the adjustable mounting structures 160 of the present invention allow the positioning of the front end module assembly to be adjusted not only in the fore and aft or longitudinal direction of the vehicle, it also allows the positioning of the front end module assembly to be adjusted horizontally (i.e., cross-vehicle) and vertically (i.e., up/down) with respect to the vehicle.

At the forward end of each rail assembly 102, 104 of the front end module assembly is a collapsible energy absorbing member 182. The collapsible energy absorbing member 182 is shown as being formed integrally with the rail assembly 104 but may be provided as a separate component for both front and rear end modules. Preferably, the collapsible energy absorbing member 182 is metal and made by high pressure hydroforming, but other methods of forming are contemplated. The absorbing member 182 collapses during impact conditions in order to reduce the magnitude of collision forces being transmitted to the frame assembly of the vehicle.

The energy absorbing member 182 has two end portions 184 and a centrally disposed intermediate portion 186 having a reduced height and width (i.e. a smaller diametric dimension) relative to the end portions 184. At the forwardmost end, the absorbing member 182 has a pair of bumper beam mounting flanges 188 to which the bumper beam 112 attaches. Bolts 190 fixedly attach the bumper beam 112 to the bumper mounting flanges 188. Other suitable attaching means such as welding may also be used, but the use of bumper mounting flanges 188 can eliminate the current use of an attaching plate welded to the bumper body and thus is preferable. Also, that the bumper mounting flanges 188 may be provided on a separate bracket and need not be formed integrally with the energy absorbing member 182.

Figure 4A:
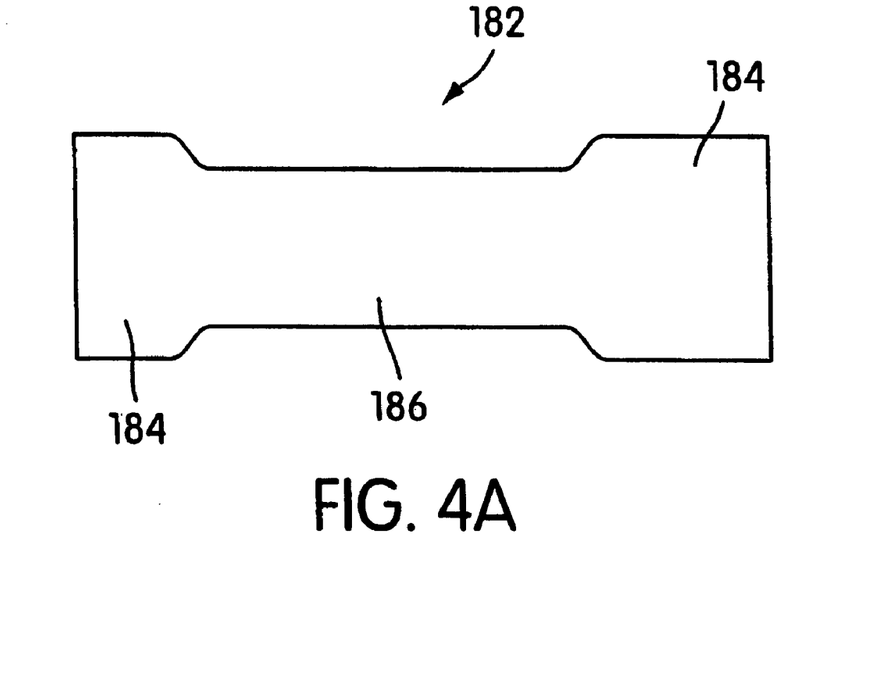
FIG. 4A is a side view of an energy absorbing member used the structural sub-system of a front and rear end module assembly isolated from the remaining components and shown in an intact condition.
Figure 4B:
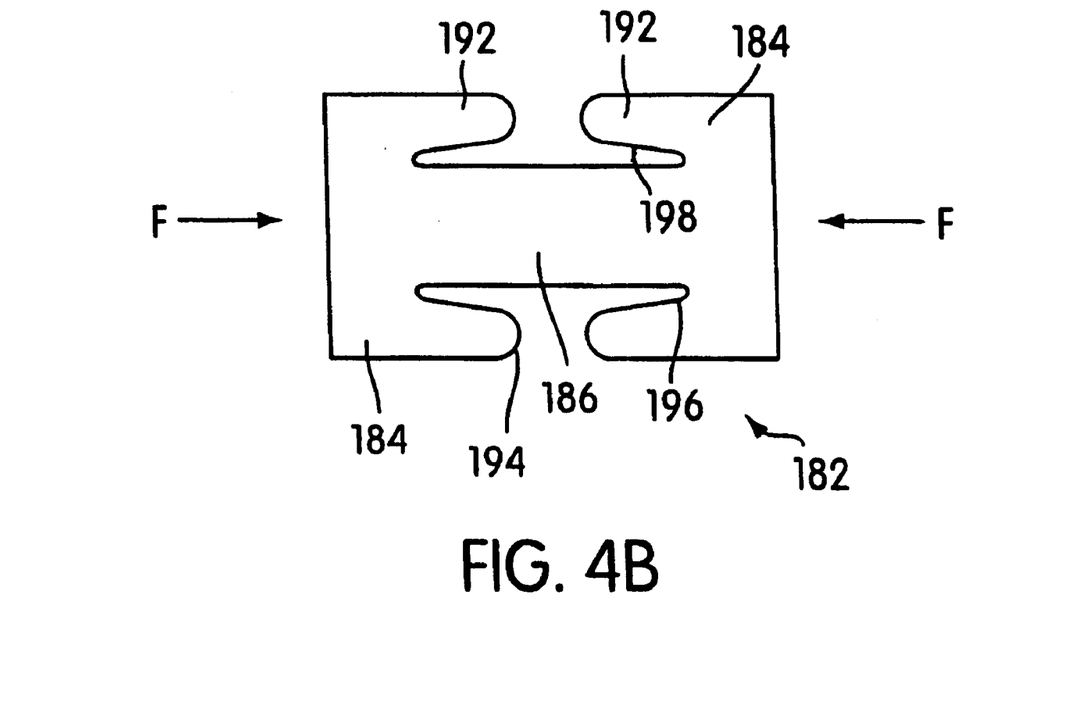
FIG. 4B is a side view of the energy absorbing member of FIG. 4a shown in a collapsed condition as it would appear after a vehicle collision.

The manner in which the energy absorbing member 182 collapses is best illustrated in FIGS. 4A–4B. FIG. 4A shows the member 182 in its normal, uncollapsed condition. FIG. 4B illustrates the condition of absorbing member 182 when a force F is applied to each end thereof sufficient to cause collapsing. The intermediate portion 186 remains intact while the end portions 184 are pushed inwardly relative to the intermediate portion 186 so that the end portions are received over the ends of intermediate portion in a telescoping like relationship. Specifically, the portions 192 that connect the end portions 184 and the intermediate portion 186 are yieldingly deformed beyond the elastic limit of their metal material to allow the end portions 184 to move linearly towards one another with the deformed portions 192 rollingly folding to a position over the central portion 186. This rollingly folding action provides the deformed portions with innermost convex corners 194, outermost concave corners 196, and a portion between these corners that extends generally parallel the exterior surface of the intermediate portion 186. In particular, these portions between the corners are disposed in between the end portions 184 and the ends of the intermediate portion 186 in the generally radial direction of the member 182. The higher the amount of force F, the further inwardly the end portions 184 will be moved toward one another and the greater the length of the deformed portions 192 will become.

Basically, the energy absorbing member 182 functions to convert collision energy into deformation energy as it collapses. Specifically, a portion of the collision energy is converted into the energy necessary to deform the energy absorbing member 182 into its collapsed condition and thus is dissipated. As a result, the energy absorbing member 182 reduces the amount of energy transmitted from the bumper beam 112 to the vehicle frame assembly.

Another way to describe the rollingly folding action of the end portions 184 is that the inside portions 198 of the deformed portions 192 facing the central portion 186 have been peeled from the end portion 184 and folded over to a position adjacent to and facing the central portion 186. The collapsible absorbing member 182 does not expand in the horizontal or vertical direction during its collapse (i.e. its diametric dimension does not increase). The end portions 184 simply move inwardly toward one another during collapsing so as to occupy a lesser volume without a significant increase in height or width.

By providing the absorbing member 182 and the bumper beam 112 on the end module assembly, there is no need to modify the rails 172 of the vehicle frame assembly in order to accommodate or provide crush zones. Thus, the rails 172 of the vehicle frame assembly can be made stiffer by virtue of the fact that the energy absorbing members 182 are incorporated directly into the front end module assembly. Also, because the absorbing members 182 of the present invention collapse inwardly over themselves, they provide adequate impact crush zones without taking up a great amount of space. One advantage of the manner in which the rolling folding action occurs during impact is that it provides for a relatively constant dissipation of energy over the duration of the impact. In comparison, members that collapse in an accordion-like manner tend to dissipate energy only during the initial portions of the collision and offer little dissipation once buckling of the accordion folds has occurred.

The force absorbing structure 182 of the present invention may be used in motor vehicles which are constructed in a conventional manner without the use of front or rear end module assemblies. The energy absorbing members 182 in this application can be mounted between the end of the frame rails and the front or rear bumper beam. The same collapsing will take place during a collision, thereby absorbing some of the collision energy that normally would have been transmitted to the frame rails. In this arrangement, the energy absorbing members 182 may be formed integrally with the frame rail ends as a result of hydroforming or another suitable manufacturing operation. However, it is preferred to form the energy absorbing members 182 separately from the frame rails 172 so that the absorbing members 182 can be easily replaced after collapsing during impact.

The arrangement for the energy absorbing members are not limited to the arrangements disclosed in this application. For example, either a single energy absorbing member or a plurality of such members may be used to achieve the desired energy dissipation. Also, a single energy absorbing member may have a series of wide portions and narrow portion that collapse relative to one another into a telescoping relationship. Thus, the member is not to be limited to a single pair of end portions with a single intermediate portion extending therebetween. Also, the energy absorbing member(s) of the present invention may be included in any type of vehicle, including space framed vehicle, unibody vehicles, and conventionally framed vehicles, in addition to the modular vehicle assembly disclosed herein.

For the purposes of the present application, the bumper beam and energy absorbing members may be considered together as an energy absorbing system that absorbs and dissipates collision energy that would otherwise be transmitted to the vehicle frame assembly.

In the embodiment shown in FIGS. 1–4B, the engine (not shown) of the vehicle is mounted on the vehicle frame assembly and is supported by a cross-vehicle engine supporting structure 200 in the form of an engine cradle. The engine supporting structure 200 extends laterally between the rails 172 of the vehicle frame assembly and provides the main structural support for the vehicle engine. Thus, in the embodiment of FIGS. 1–4A, it is not contemplated to mount the engine on the structural sub-system of the front end module assembly before mounting the assembly to the vehicle.

Figure 3:
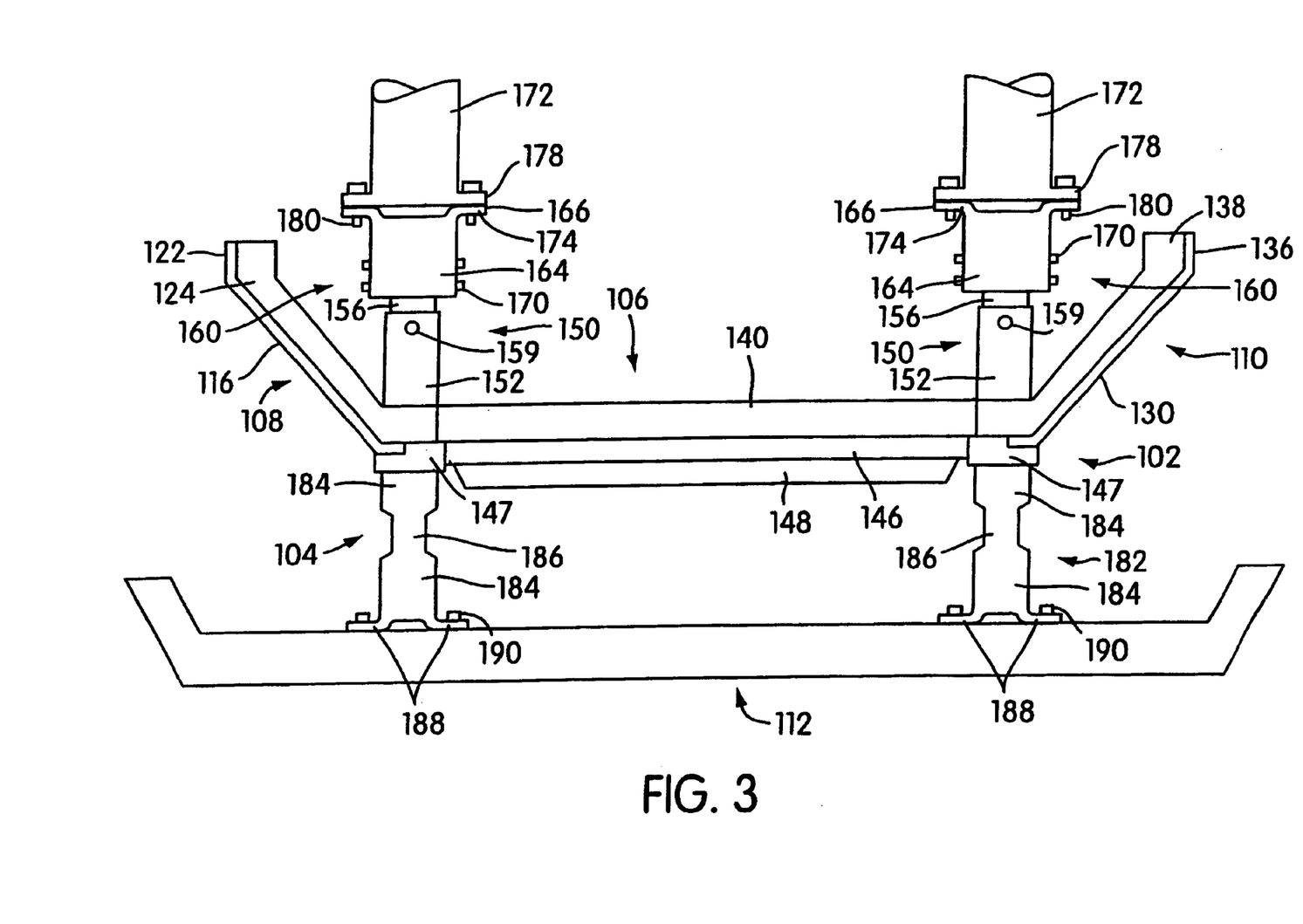
FIG. 3 is a top view of the front end module assembly of FIG. 1.
Figure 5:
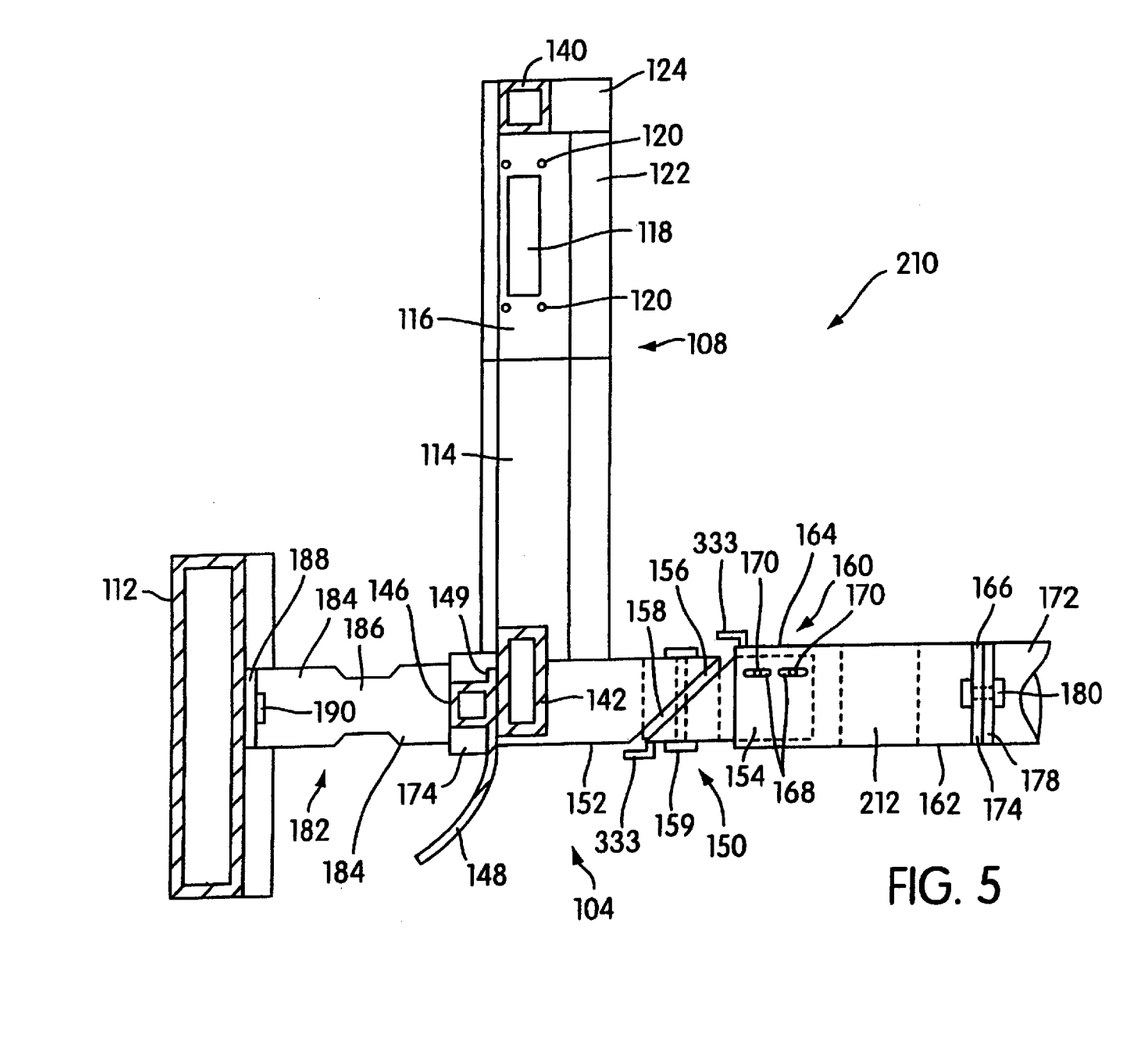
FIG. 5 is a cross-sectional view of a second embodiment of a structural sub-system of a front end module assembly constructed in accordance with the principles of the present invention.

Turning now to the embodiment of FIG. 5, there is shown a cross-sectional view of a structural sub-system of a front end module assembly that is substantially identical to the arrangement shown in FIGS. 1–3. The major structural and functional difference between the arrangement of the first embodiment and the arrangement of the module assembly of the second embodiment is that the second embodiment comprises an engine supporting structure 212 in the form of an engine cradle constructed and arranged to support a vehicle engine (not shown) mounted on the front end module assembly before mounting the module assembly to the vehicle. The engine cradle could be fully dressed or complete and ready to run with the a series of vibration damping devices provided thereon for damping engine vibrations. One advantage of this arrangement is that the systems associated with the front end of the vehicle and the engine can be tested together prior to delivery to the OEM to ensure proper functioning of all components.

Mounting the engine within the front end module assembly before the assembly is mounted on a vehicle offers a number of advantages. All of the components associated with the front end of the vehicle that are to be operatively connected to the engine (e.g., the fan, the radiator, etc.) can now be connected before delivery to the OEM or subassembled in the OEM plant prior to assembling the front end module assembly to the vehicle. Such component may include either components that draw power from the engine from a belt and pulley system or components that draw power from the alternator via electrical wiring. This reduces the number of manufacturing and assembly steps the OEM must take in order to connect components to the engine. It also reduces the need for the OEM to perform the extra step of mounting the engine because it is pre-mounted within the front end module assembly. In addition, the costs associated with delivering the engine and other components separately are reduced by virtue of the fact that all of the components associated with the front end of the vehicle, including the engine, can now be pre-mounted on the front end module assembly and delivered together to the assembly plant. It is contemplated that almost all of the functional components located forwardly of the passenger compartment could now be mounted onto the front end module assembly due to the fact that the engine can now be mounted therein.

Figure 6:
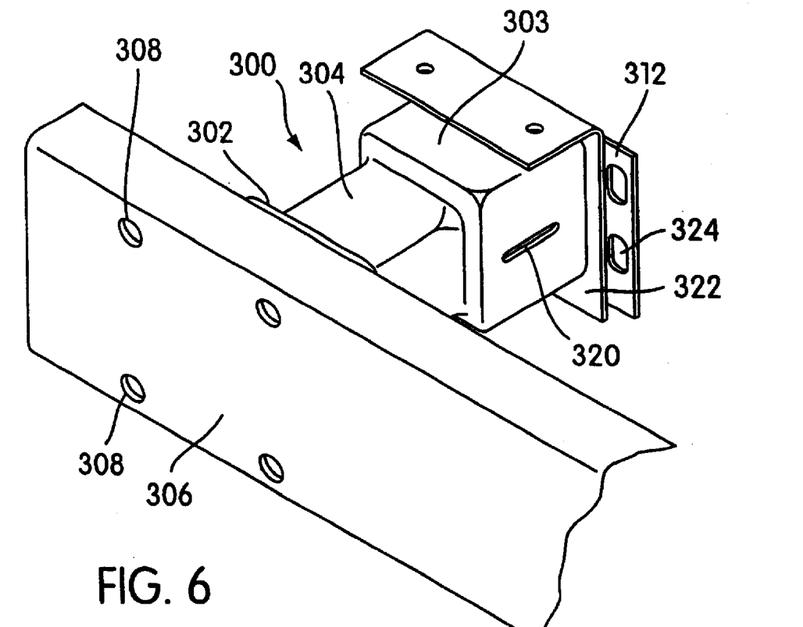
FIG. 6 is a perspective view showing a perspective view of an alternative arrangement for mounting the end module assembly with one end portion of the energy absorbing member providing for adjustments in the longitudinal direction of the vehicle.
Figure 7:
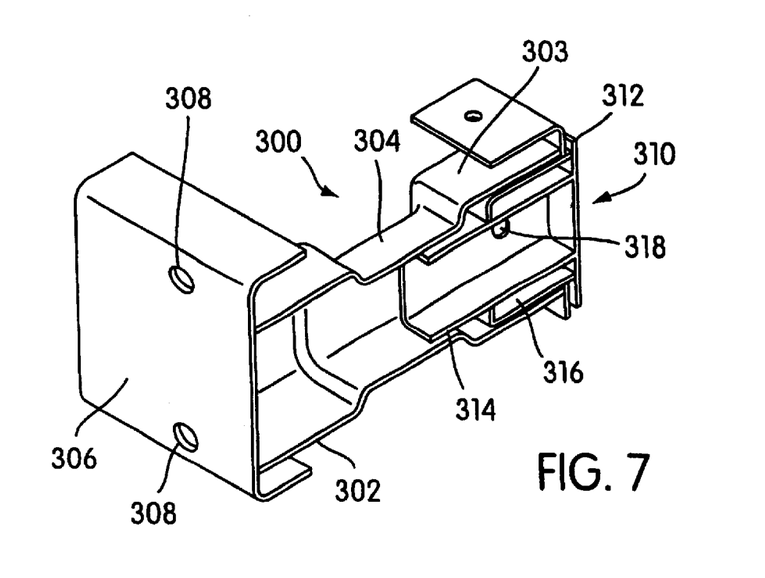
FIG. 7. is a cross-section taken longitudinally with respect to the vehicle through the arrangement of FIG. 6 showing an annular force isolator disposed between the energy absorbing member and the mounting bracket.

FIGS. 6 and 7 show an alternative arrangement for the force isolator and the energy absorbing member. The rail assemblies are entirely omitted and replaced by elongated energy absorbing members 300. Only one absorbing member 300 is shown, but it can be appreciated that another identical absorbing member is provided parallel to the one shown so that they can each be connected to respective rails of the vehicle frame assembly. As with the energy absorbing members 182, energy absorbing members 300 have a pair of end portions 302, 303 and an intermediate portion 304. A bumper beam 306 is connected directly to the first end portion 302 of the energy absorbing member 300 by fasteners 308. The second end portion 303 forms a part of the force isolator assembly 310 and is operatively connected to the vehicle frame assembly at the forward end of a frame rail (not shown) by mounting bracket 312. The absorbing member 300 collapses in the same manner as the absorbing member 182 described above to dissipate collision energy. Also, in addition to collapsing, the rear end of the energy absorbing member 182 abuts against the bracket 312 to ensure that any undissipated collision forces are transmitted to the vehicle frame assembly.

The bracket 312 has a forwardly extending projection 314 that is received within the end of the energy absorbing member second end portion 303. An annular ring 316 of hard rubber slides over the projection 314 so as to be disposed between the end portion 303 and the projection 314. This annular ring 316 functions as a force isolator to permit limited movement between the vehicle frame assembly and the components of the front end module assembly. These elements provide the force isolator assembly 310 and prevent jarring movements of the vehicle frame assembly from being transmitted to the body assembly via the front end module assembly.

The second end portion 303 also cooperates with the bracket 312 to provide for adjustable mounting of the module assembly. Specifically, the bracket projection 314 has a pair of fastener receiving openings 318 formed in the side walls thereof and the second end portion 313 has a pair of elongated slots 320 formed in the side walls thereof. These slots 320 extend in the longitudinal direction of the vehicle and align with the openings 318. Fasteners are inserted through the slots 320 and openings 318 and then tightened to prevent relative movement between the absorbing member 300 and the bracket 312. If there is some misalignment when the end module assembly is installed on the partially completed vehicle, the fasteners can be loosened to allow relative movement between the absorbing member 300 and the bracket 312 in order to reposition and properly align the module assembly. Then, the fasteners can be re-tightened to prevent relative movement between the bracket 312 and the absorbing member 300, thereby securing the end module assembly in place.

Additionally, the bracket has a pair of mounting flanges 322 that mount to an associated frame rail. The mounting flanges 322 each have oversized fastener-receiving openings 324 that allow fasteners to be inserted therethrough to secure the end module assembly to the vehicle frame rails. These oversized openings allow the fasteners to be loosened so that the end module assembly can be repositioned either vertically or laterally relative to the remainder of the vehicle to achieve proper alignment. Then, the fasteners can be tightened to prevent further relative movement of module assembly. Thus, the adjusting movements provided by the adjustable mounting structure 160 of the previous embodiments are also provided by the arrangement disclosed in FIGS. 6 and 7. The components in FIGS. 6 and 7 that provide these adjusting movements may also be considered to constitute an adjustable mounting structure.

The arrangement of FIGS. 6 and 7 is advantageous because it eliminates a number of the components used in the previous embodiments. Specifically, the rail assemblies 102 and 104 of the previous embodiments are replaced with the energy absorbing members 300. These energy absorbing members 300 also provide mounting points for the internal support structure 100 and function to support the support structure 100.

It can thus be appreciated that the objectives of the present invention have been fully and effectively accomplished by the foregoing preferred embodiments. It should be understood, however, that these embodiments have been provided to illustrate the structural and functional principles of the present invention and are not intended to be limiting. To the contrary, the present invention is intended to encompass all modifications, alterations, and substitutions within the scope of the appended claims.

What is claimed:

1. A method for making a plurality of end module assemblies for installation on ends of a plurality of partially completed vehicles having varying heights and/or widths at their respective ends, said method comprising:
   providing a plurality of exterior fascias that are each configured to comprise a portion of a corresponding vehicle body assembly when said end module assemblies are installed on their corresponding partially completed vehicles;
   providing a plurality of exterior visible components;
   forming a plurality of internal support structures each having a height and width suitable to support said exterior visible components in proper alignment with respect to corresponding ones of said exterior fascias when said exterior visible components are mounted thereto, said internal support structures being formed by a method comprising:
      forming a size determining component for each of said plurality of internal support structures so as to provide said size determining components with varying lengths in a given direction, the length of each of said size determining components in the given direction being determinative of the heights or widths of said internal support structures when said internal support structures are assembled;
      shaping said size determining components by successively feeding blank size determining components of metal material into a die assembly and operating said die assembly to impart the same general shape to each blank size determining component irrespective of the length of said blank size determining components;
      forming remaining components for each of said plurality of internal support structures; and
      assembling the size determining component of each internal support structure with the remaining components of each internal support structure so as to form the aforesaid plurality of internal support structures;
   mounting said exterior fascias in place with respect to corresponding ones of said internal support structures, and
   mounting said exterior visible components to corresponding ones of said internal support structures in proper alignment with respect to the corresponding ones of said exterior fascias.

2. The method according to claim 1, wherein forming a size determining component for each of said plurality of internal support structures so as to provide said size determining components with varying lengths in a given direction is performed by cutting said size determining components after shaping said size determining components.

3. The method according to claim 2, wherein forming a size determining component for each of said plurality of internal support structures so as to provide said size determining components with varying lengths in a given direction is performed by cutting said blank size determining components before feeding said blank size determining components into said die assembly.

4. The method according to claim 1, wherein said method for making said internal support structures further comprises forming a plurality of pairs of outer support structures, each of said outer support structures providing mounting points for said exterior visible components and wherein forming and shaping said size determining component for each internal support structure includes:

forming a set of upper and lower cross-vehicle support members for each of said plurality of internal support structures so as to provide said upper and lower cross-vehicle support members with varying lengths, the length of said upper and lower cross-vehicle support members of each set being determinative of the width of a corresponding one of said internal support structures when said internal support structures are assembled;

shaping said upper and lower cross-vehicle support members by successively feeding blank upper and lower cross-vehicle support members of metal material into said die assembly and operating said die assembly to impart the same general shape to each blank cross-vehicle support member;

said method of making said internal support structures further comprising securing said upper and lower cross-vehicle support members between the outer support structures of each pair so as to form said internal support structures.

5. The method according to claim 4, wherein forming said pairs of outer support structures includes:

forming a pair of outer support structures for each of said plurality of internal support structures so as to provide said outer support structures with varying lengths, the lengths of said outer support structures of each pair being determinative of the height of a corresponding one of said internal support structures when said internal support structures are assembled;

shaping said outer support structures by successively feeding blank outer support structures of metal material into the same die assembly and operating said die assembly to impart the same general shape to each outer support structure.

6. The method according to claim 1, wherein said method for making said internal support structure further comprises forming sets of upper and lower cross-vehicle support structures and wherein forming and shaping said size determining components includes:

forming a pair of outer support structures for each of said plurality of internal support structures so as to provide said outer support structures with varying lengths, the length of said outer support structures of each pair being determinative of the height of a corresponding one of said internal support structures when said internal support structures are assembled;

shaping said outer support structures by feeding successive blank outer support structures of metal material into the same die assembly and operating said die assembly to impart the same general shape to each blank outer support structure;

said method of making said internal support structures further comprising securing, said upper and lower cross-vehicle support members between the outer support structures of each pair so as to form said internal support structures.

* * * * *